United States Patent
Amado-Torres et al.

(10) Patent No.: US 10,898,857 B2
(45) Date of Patent: Jan. 26, 2021

(54) MEMBRANES WITH ALTERNATIVE SELECTIVE LAYERS

(71) Applicant: Oasys Water LLC, Dover, DE (US)

(72) Inventors: Diego Amado-Torres, Cambridge, MA (US); John Charest, Cambridge, MA (US)

(73) Assignee: OASYS WATER LLC, Dover, DE (US)

(*) Notice: Subject to any disclaimer, the term of this patent is extended or adjusted under 35 U.S.C. 154(b) by 11 days.

(21) Appl. No.: 16/331,218

(22) PCT Filed: Sep. 7, 2017

(86) PCT No.: PCT/US2017/050454
§ 371 (c)(1),
(2) Date: Mar. 7, 2019

(87) PCT Pub. No.: WO2018/049013
PCT Pub. Date: Mar. 15, 2018

(65) Prior Publication Data
US 2019/0217249 A1 Jul. 18, 2019

Related U.S. Application Data

(60) Provisional application No. 62/384,376, filed on Sep. 7, 2016.

(51) Int. Cl.
*B01D 61/00* (2006.01)
*B01D 69/12* (2006.01)
*B01D 71/56* (2006.01)
*B01D 71/60* (2006.01)
*C02F 1/44* (2006.01)

(52) U.S. Cl.
CPC ......... *B01D 61/002* (2013.01); *B01D 69/125* (2013.01); *B01D 71/56* (2013.01); *B01D 71/60* (2013.01); *C02F 1/445* (2013.01); *B01D 69/12* (2013.01)

(58) Field of Classification Search
None
See application file for complete search history.

(56) References Cited

U.S. PATENT DOCUMENTS

| | | | |
|---|---|---|---|
| 3,904,519 A * | 9/1975 | McKinney, Jr. | B01D 71/56 210/654 |
| 5,173,335 A | 12/1992 | Arthur | |
| 5,693,227 A | 12/1997 | Costa | |
| 2007/0039874 A1* | 2/2007 | Kniajanski | B01D 67/0093 210/500.37 |
| 2011/0284458 A1* | 11/2011 | Mickols | B01D 71/56 210/500.38 |
| 2013/0213880 A1* | 8/2013 | Hirozawa | B01D 71/08 210/483 |
| 2014/0054215 A1 | 2/2014 | McGinnis | |
| 2015/0231572 A1 | 8/2015 | Vankelecom et al. | |
| 2015/0375178 A1* | 12/2015 | Ko | B01D 71/56 210/500.33 |
| 2017/0056840 A1* | 3/2017 | Koehler | B01D 69/125 |

FOREIGN PATENT DOCUMENTS

JP    04074517 A  *  3/1992

OTHER PUBLICATIONS

Shimizu et al—JP 04074517 A Machine Translation—1992 (Year: 1992).*
International Search Report and Written Opinion dated Dec. 18, 2017 corresponding to International Patent Application No. PCT/US2017/050454.
Liu, Li-Fen et al. Study on a novel polyamide-urea reverse osmosis composite membrane (ICIC-MPD) I. Preparation and characterization of ICIC-MPD membrane. Journal of Membrane Science, 2006, vol. 281, pp. 88-94.

* cited by examiner

*Primary Examiner* — Bradley R Spies
(74) *Attorney, Agent, or Firm* — Leason Ellis LLP

(57) ABSTRACT

The invention relates to membranes, membrane modules, and applications therefor. In particular, the invention relates to the construction of membranes for use in osmotically driven membrane processes.

14 Claims, 3 Drawing Sheets

1, 3, 5 - Benzenetriisocyanate Route of Synthesis

Scheme for Polyamideurea Formation

MEMBRANES WITH ALTERNATIVE SELECTIVE LAYERS

CROSS-REFERENCE TO RELATED APPLICATIONS

This application claims priority to and the benefit of U.S. Provisional Patent Application No. 62/384,376, filed Sep. 7, 2016, the entire disclosure of which is hereby incorporated by reference herein in its entirety.

FIELD OF THE INVENTION

The invention generally relates to membranes and membrane modules and more particularly improvements to membrane selective layers.

BACKGROUND

Osmotic separation processes generally involve generating water flux across a semipermeable membrane based on osmotic pressure differentials. Solute may be rejected by the membrane and retained on either side due to the greater permeability of water than the solute with respect to the selective barrier of the membrane. Solutes may be undesirable and therefore removed from a process stream via membrane separation for purification, or desirable in which case they may be concentrated and collected via a membrane separation process.

Membranes may be used in various osmotically driven separation processes such as, but not limited to, desalination, wastewater purification and reuse, FO or PRO bioreactors, concentration or dewatering of various liquid streams, concentration in pharmaceutical and food-grade applications, PRO energy generation and energy generation via an osmotic heat engine.

SUMMARY

Aspects relate generally to forward osmosis membranes and methods of making forward osmosis (FO) membranes.

Polymeric membranes typically include a porous support structure that provides mechanical and structural support for a selective layer (also referred to herein as a barrier or active layer). Membranes may be formed in various shapes including spiral wound, hollow fiber, tubular and flat sheet depending on an intended application. Membrane characteristics should be customized to achieve ideal performance and may vary between specific applications. For example, in FO and PRO applications, the effectiveness of a separation process may be enhanced by reducing the thickness and tortuosity of the membrane, while increasing its porosity and hydrophilicity, without sacrificing strength, salt rejection, and water permeability properties.

In accordance with one or more embodiments, a method of making a forward osmosis membrane may comprise providing a support structure (for example, one including at least a first layer and a second layer), applying a material to the support structure (e.g., the first layer) to form a membrane support layer, applying a barrier material to the membrane support layer to form the forward osmosis membrane. Generally, the membranes described herein can be used alone or in combinations and can be disposed within an enclosed housing or submerged in a tank, either an open or closed tank. In addition, the various membranes can be arranged in plate and frame or spiral wound configurations. Examples of various membrane configurations can be found in U.S. Pat. No. 8,181,794; U.S. Patent Publication Nos. 2011/0036774, 2014/0263025, and 2015/0136676; and PCT Publication No. WO2013/022945; the disclosures of which are hereby incorporated by reference herein in their entireties. Furthermore, the various membranes described herein can be incorporated into a variety of osmotically driven membrane systems/processes. Examples of osmotically driven membrane processes are disclosed in U.S. Pat. Nos. 6,391,205, 7,560,029, 9,044,711, 9,248,405, 9,266,065, and 9,352,281; the disclosures of which are hereby incorporated herein by reference in their entireties.

In various aspects, the invention relates to membranes for forward osmosis that include a support layer and a selective layer. The selective layer includes either a polyamide or a polyamide-urea. In various embodiments, the selective layer includes the polyamide or polyamide-urea in combination with at least one of an amine or an amide, such as a primary or secondary amine (e.g., a biguanide). The membrane selective layer is disposed on the membrane support layer and is typically formed via interfacial polymerization. Generally, interfacial polymerization involves the application of an aqueous phase followed by exposure to an organic phase. The various membrane selective layers disclosed herein include unique combinations of substances in the aqueous phase, the organic phase, or both. In certain exemplary embodiments, the aqueous phase includes m-phenylenediamine (MPD) (or other aromatic diamine or, for example, 1,3,5-phenylenetriamine), an acid (e.g., HCl), triethylamine (TEA), triethanolamine (TEOA), diethylamine (DEA), a polymeric amine (e.g., biguanide), a polyelectrolyte, water (e.g., deionized or RO water), or combinations thereof as disclosed in greater detail below. In some embodiments, the aqueous phase can additionally or alternatively include ammonium chloride, a trimethylammonium functionalized amine (e.g., (2-aminoethyl) trimethylammonium chloride), and/or various other additives, such as one or more ionic or non-ionic surfactants. In certain exemplary embodiments, the organic phase includes trimesoyl chloride (TMC) in a solvent (e.g., Isopar G or toluene) with an acid chloride, an aldehyde, certain di- or tri-isocyanates, or combinations thereof as disclosed in greater detail below.

In various embodiments, the membrane also includes a polymeric support structure (e.g., polysulfone or polyethersulfone), with a thickness of less than about 2 mils and a Frazier air permeability of greater than about 100 cfm/ft2 min upon which a support layer is formed. The support layer may have a polymer loading of about 5 g/m$^2$ to about 20 g/m$^2$, with a thickness of less than 2 mils. The selective layer may have a thickness of less than 200 nm.

In various embodiments where the support structure is a bilayer substrate including first and second separable layers, wherein a top surface of the first layer corresponds to the first side of the support structure. The method can also include the step of separating the second layer of the bilayer substrate from the first layer of the bilayer substrate. In some embodiments, the step of separating the second layer of the bilayer substrate from the first layer of the bilayer substrate modifies a pore structure in the support layer. The first layer of the bilayer substrate can have a Frazier air permeability of greater than about 50 cfm/ft2 min and a thickness of less than about 2 mils. The material applied to the first layer of the bilayer substrate can have a polymer loading of between about 5 and 20 g/m$^2$.

In one aspect, the invention relates to a forward osmosis membrane having a support substrate with a first surface and an opposing second surface, a support layer disposed on the first surface of the support substrate and made of a polymeric material, and a selective layer disposed on the support layer, where the selective layer includes a polyamide urea or polyamide made from a diamine monomer, a polyamine, an organic base, a reactive monomer, and a benzene triisocyanate.

In various embodiments, the forward osmosis membrane selective layer may also include a non-ionic surfactant and/or an aldehyde. The diamine monomer can include a diaminohydroxypyrimidine or derivatives thereof and/or m-phenylenediamine, either solely or in varying proportions. The reactive monomer may include trimesoyl chloride and the organic base may include at least one of triethanolamine, triethylamine, or diethylamine. In some embodiments, the polyamine includes metformin. The support layer is typically either polysulfone or polyethersulfone.

In another aspect, the invention relates to a method of manufacturing a forward osmosis membrane. The method includes the steps of providing a support substrate having a first side and an opposing second side, depositing a polymeric support layer on the first side of the support substrate, and forming a selective layer on the support layer via interfacial polymerization. The step of forming the selective layer includes introducing the support layer to an aqueous phase including an aromatic diamine monomer, a polyamine, and an organic base and introducing the support layer and aqueous phase to an organic phase including a reactive monomer, a solvent, and a benzene triisocyanate.

In various embodiments, aromatic diamine monomer in the aqueous phase may include m-phenylenediamine and/or a diaminohydroxypyrimidine or derivatives thereof, either solely or in various proportions. The aqueous phase may also include a non-ionic surfactant as disclosed herein. Additionally, the reactive monomer in the organic phase may include trimesoyl chloride. In some embodiments, the organic and/or aqueous phase may include an aldehyde. The polyamine may include metformin.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which.

DETAILED DESCRIPTION

Figure 1A:
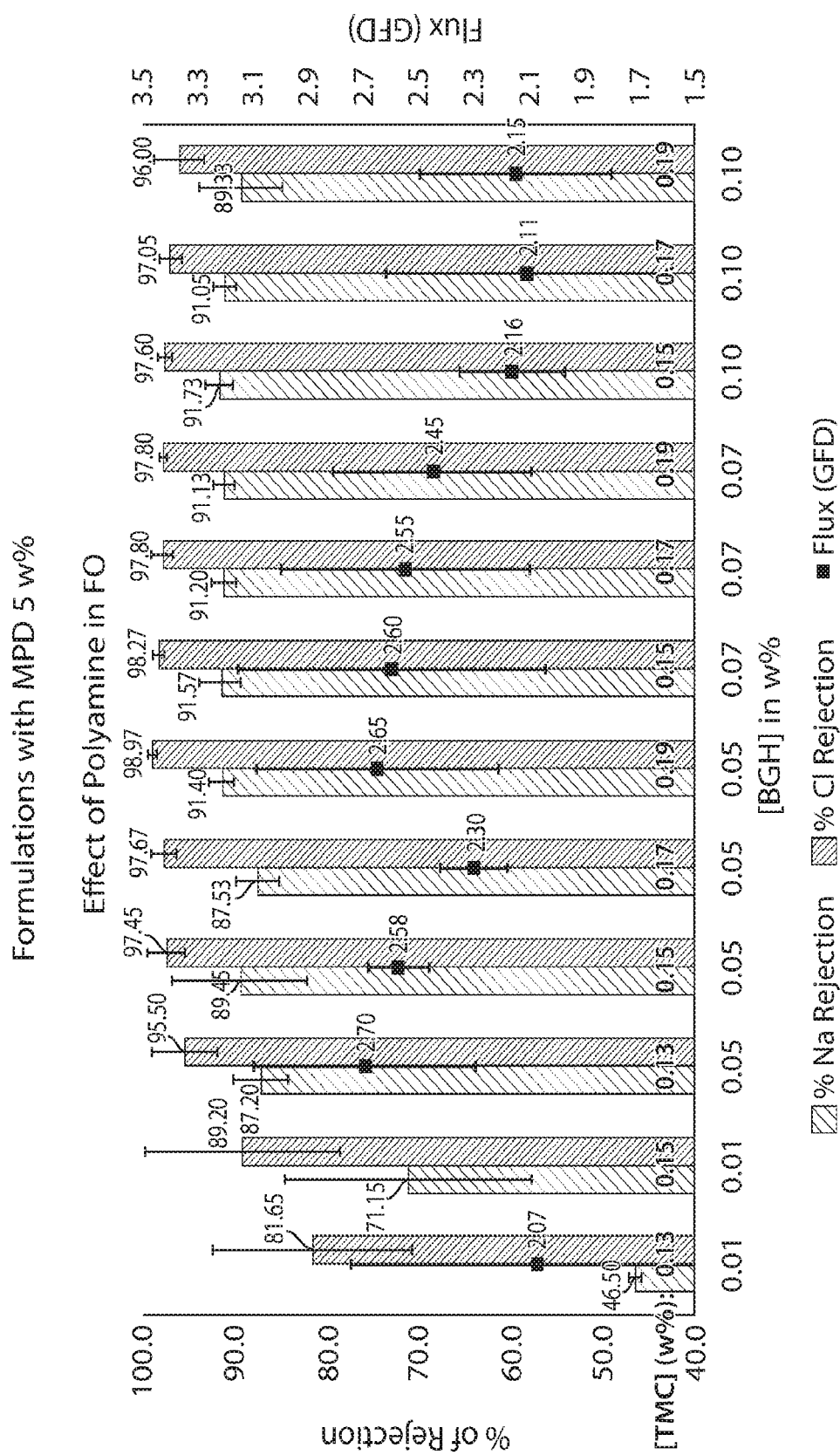
FIGS. 1A and 1B are graphical representations of experimental data relating to various active layers chemistries in accordance with one or more embodiments of the invention.

In accordance with one or more embodiments, the manufacture of membranes with improved performance for various osmotic separation processes may be facilitated. In at least some embodiments, at least one of the thickness, chemistry, charge, or configuration of one or more of the membrane layers can be created or modified to reduce cost, enhance mass transfer and higher flux within the membrane by reducing resistance to fluid flow and solute diffusion through the membrane, enhance selective permeability of solutes, and/or increase the amount of active membrane area which may be provided in a separation module.

One or more of the embodiments described herein may find applicability in the manufacture of membranes for FO and pressure retarded osmosis (PRO) processes, as well as offer benefits for the manufacture of membranes used in pressure driven separations such as reverse osmosis (RO), microfiltration (MF), ultrafiltration (UF) and nanofiltration (NF).

In accordance with one or more embodiments, a substrate may be provided to facilitate membrane fabrication. The substrate can be removable or sacrificial and in some embodiments, a bilayer substrate may be provided to facilitate membrane fabrication, where the bilayer substrate may include a membrane support layer that will serve as the membrane support layer of a final membrane product. The membrane support layer of the bilayer substrate may be of reduced thickness compared to conventional membrane support layers while at the same time providing an overall thickness requisite for membrane manufacturing, including the application and processing of a selective layer upon the support layer. In some embodiments, the bilayer support may include a removable backing layer in addition to the membrane support layer to provide the extra thickness. The removable backing layer may be intended to be separated from the support layer subsequent to membrane fabrication. In other embodiments, the bilayer substrate may include a backing layer intended to remain intact subsequent to membrane fabrication. In at least some embodiments, the backing layer may remain connected to the support layer and incorporated into a membrane module. Examples of bilayer substrates for use in membrane manufacturing can be found in the '794 patent incorporated above.

In accordance with one or more embodiments, the substrate may include a membrane support layer generally affixed thereto. The membrane support layer may be the support layer of a resultant membrane while the substrate may be largely sacrificial, temporarily providing increased thickness to the support layer to facilitate membrane processing. The membrane substrate may generally be a light basis weight layer of reduced thickness in comparison to conventional membrane support layers. The support layer may contain less than about 30 $g/m^2$ of material overall. The supporting material may be applied in a coating of between about 8 and 17.5 $g/m^2$. The top support layer may be made in a wet laid process, dry laid process, or a woven material. Alternately, the support layer may be made by deposition in the presence of an electrical field, such as in an electrospinning method. Materials may include polyethylene terephthalate (PET), polypropylene (PPP) or other polymers typically used in the fabrication of pressure driven membrane supports, and may additionally be designed to have a hydrophilic nature. In some embodiments, the support structure may be a paper, such as a polymeric paper. In some embodiments, the support material may be made of polypropylene, polysulfone, polyacrylonitrile, or other porous polymers suitable for creating a support for interfacial polymerization of a polyamide, polyamide-urea, or similar type barrier layer. Hydrophilic additives may be introduced to the support material.

A selective layer may be applied to the support material of the substrate during a membrane manufacturing process. In some embodiments, a semipermeable layer may be applied as the selective layer. The semipermeable layer may comprise a polymer. In certain embodiments, the semipermeable layer may comprise a polyamide, such as polyamide-urea, a block co-polymer, a block tri-polymer, or polypiperazine. In some embodiments, a polysulfone layer may be applied to a PET support structure to form a support layer for the selective layer.

In accordance with one or more embodiments, the selective layer in the disclosed thin-film composite membranes may be a semipermeable three-dimensional polymer network, such as an aliphatic or aromatic polyamide, polyamide-urea, aromatic polyhydrazide, poly-bensimidazolone, polyepiamine/amide, polyepiamine/urea, polyethyleneimine/urea, sulfonated polyfurane, polybenzimidazole, polypiperazine isophtalamide, a polyether, a polyether-urea, a polyester, or a polyimide or a copolymer thereof or a mixture of any of them. In certain embodiments, the selective barrier may be an aromatic or non-aromatic polyamide, such as residues of a phthaloyl (e.g., isophthaloyl or terephthaloyl) halide, a trimesoyl halide, or a mixture thereof. In another example, the polyamide may be residues of diaminobenzene, triaminobenzene, polyetherimine, piperazine or poly-piperazine or residues of a trimesoyl halide and residues of a diaminobenzene. The selective barrier may also include residues of TMC and MPD.

Generally, conventional membrane fabrication processes may be used (see, e.g., U.S. Pat. Nos. 3,926,798 and 6,368,507, the disclosures of which are hereby incorporated herein by reference) to produce the selective layer; however the formulas are different than what are conventionally used. Typically, the interfacial polymerization process involves coating the membrane support layer with an aqueous phase first and then exposing the aqueous phase to an organic phase to produce the selective layer and final membrane for use in forward osmosis applications.

Generally, the aqueous phase includes the MPD in water, with or without a surfactant or other optional additives. In a particular embodiment of the invention, the aqueous phase also includes an amine or amide functionality, such as a biguanide compound (e.g., polyhexylmethyl biguanide (PHMB), heterocyclic biguanide, phenformin, proguanil, polyaminopropyl biguanide, alexidine, chlorohexidine, chloroproguanil, metformin, and buformin). In some cases, where the amide is introduced in the aqueous phase during the interfacial polymerization, certain concentrations of components will aid stabilization of the amine/amide in the selective layer by anchoring the amine/amide by means of, for example, reacting it with an aldehyde, which can be introduced via the organic phase. In various embodiments, the MPD is present in the aqueous phase from about 2% wt to about 15% wt, preferably about 3% wt to about 12% wt, and more preferably about 5% wt to about 10% wt.

In some alternative embodiments, the monomer in the aqueous phase (i.e., MPD) can be replaced or supplemented with monomers that have a higher electronic density and that at the same time are easily functionalizable to incorporate "click chemistry" features (i.e., functional groups that react with counterparts under very mild conditions). Generally, the limitation of MPD (the most common water soluble monomer for interfacial polymerization in the fabrication of thin film composite membranes) is the lack of further functionalization due to the absence of reactive functionalities besides the two amino groups used in the polymerization reaction.

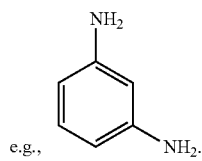

e.g.,

Examples of these replacement monomers include diaminohydroxypyrimidines (e.g., 2,4-diamino-6-hydroxypyrimidine (DHP) and its derivatives). For example:

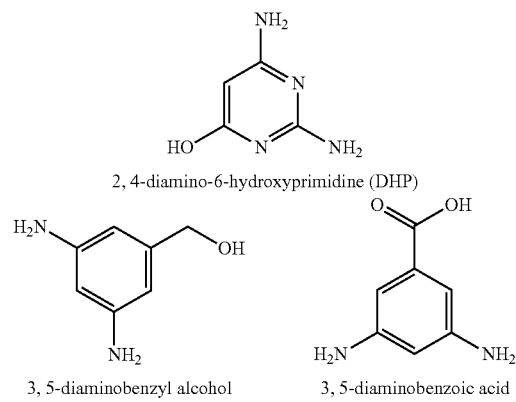

2, 4-diamino-6-hydroxyprimidine (DHP)

3, 5-diaminobenzyl alcohol     3, 5-diaminobenzoic acid

The DHP or other monomers may be present in about 0.5% wt to about 2.0% wt. The DHP derivatives can be used directly as a monomer in the aqueous phase or it can be generated or functionalized via chemical transformation of a hydroxyl group into reactive functionalities for "conjugation" or "click" chemistry. In one example, the heteroatoms in the aromatic ring increase the electronic density of the molecule and make it bulkier without hindering the reactivity of the amino groups; which presents a greater obstacle for large ions, such as sodium and chloride. In another example, the chemical transformations of the hydroxyl groups provide access to more reactive functionalities, such as alkynes, vinyl, epoxides, hydrazides, etc. These functionalities are used either for conjugation or click chemistry with counterparts from the organic phase during interfacial polymerization and/or the curing process or alternatively or additionally, with counterparts from the aqueous phase during the curing process. In some embodiments, 100% of the MPD is replaced; however, in other embodiments, the MPD could still be present in about 50% to about 95%, with the other monomer present in about 5% to about 40%. In one embodiment, the aqueous phase includes the DHP in about 1% wt along with TEA in about 10% wt.

The polyamine can be incorporated in the aqueous phase with a concentration of about 0.005% wt to about 0.25% wt, preferably about 0.01% wt to about 0.2% wt, and more preferably about 0.03% wt to about 0.15% wt. In one particular embodiment, the polyamine is present at about 0.07% wt and in another is present at about 0.12% wt. In some embodiments, the monomer metformin can be used as an additive in the aqueous phase. The concentrations of the metformin can range from about 0.01% wt to about 1.0% wt or greater. Once in the aqueous phase, metformin competes with the monomer of the aqueous phase (e.g., MPD) for a place to react with the TMC in the organic phase, either during the interfacial polymerization or during the curing.

As a result, some of the metformin will be chemically bonded to the selective layer, yet preserving the cross-link.

In addition, an acid can be added to customize the pH level of the aqueous phase. For example, the aqueous phase can have a pH of about 8 to about 12, preferably about 9 to about 11. In some embodiments, the acid (e.g., hydrochloric acid) can be present at about 1.0% wt as necessary to achieve the desired pH of the aqueous phase. The aqueous phase can also include the TEA, TEOA, DEA, or combinations thereof in about 1% wt to about 5.0% wt, preferably about 1.5% wt to 4.0% wt. In some embodiments, the DEA is more desirable as it is typically more reactive than the TEA/TEOA and would react better with the acid chlorides present in the organic phase.

In various embodiments, the monomers will be included in various combinations as necessary to customize the final membrane properties, such as membrane hydrophilicity, surface charge, thickness, and smoothness (in some cases using an aromatic monomer can have an additional impact on the smoothness of the membrane). In one optional embodiment, the membrane support layer is exposed to a different monomer (either sequentially or alternatingly) to further customize the selective layer.

Typically, the organic phase consists only of an organic solvent (e.g., isopar G or toluene) and TMC at about 0.1% wt to about 0.30% wt, preferably about 0.15% wt to about 0.20% wt, with a concentration of about 0.13% wt, 0.17% wt., 0.19% wt., 0.23% wt, and 0.27% wt in certain embodiments. In various embodiments, an additive is added to the monomer organic solution, such as an aromatic aldehyde, ester, or carboxylic functionality is incorporated in the organic phase in concentrations ranging from about 0.1 w % to 0.5 w %. In some cases, the additive is added to the organic phase to further stabilize the amine/amide or its derivatives in the aqueous phase. Examples of these additives include 4-formyl-1,3-benzene disulfonic acid (other examples of water soluble compounds generally include molecules with an aldehyde and/or carboxylic acid and/or molecules having sulfonate or phosphate groups, such as 4-formyl benzoic acid, formyl-4-hydroxybenzoic acid, glyoxal, phosphorylated serine, methyl ester sulfonate). These added molecules may cross-link the pores of the selective layer making the pores tighter and the membrane more selective. The reactions are preferably performed in an acidic environment. Examples of di- and tri-aldehydes include benzene-1,3,5-tricarboxaldehyde, formaldehyde, isophthalaldehyde, 2,6-pyridinedicarboxaldehyde, terephthalaldehyde, 2,5-thiophenedicarboxaldehyde, glutaric dialdehyde, sodium nitromalonaldehyde monohydrate, and 2,2'-trimethylenebis-1,3-dioxolane.

In some alternative embodiments, in particular applications where the membrane selective layer may be exposed to acid cleanings, it is possible to produce a selective layer rich in sulfonates in order to lower the isoelectric point of the membrane from, for example, pH 4.0 to about pH 2.0. This can be accomplished by capping carboxylates (pKa 3-4) that may be present with the sulfonates (pKa 1-2), such that when the membrane is in an acidic environment it will remain generally negatively charged due to the reduced isoelectric point. In various embodiments, the sulfonates can be added to the aqueous phase or the organic phase, preferably the organic phase.

Figure 1B:
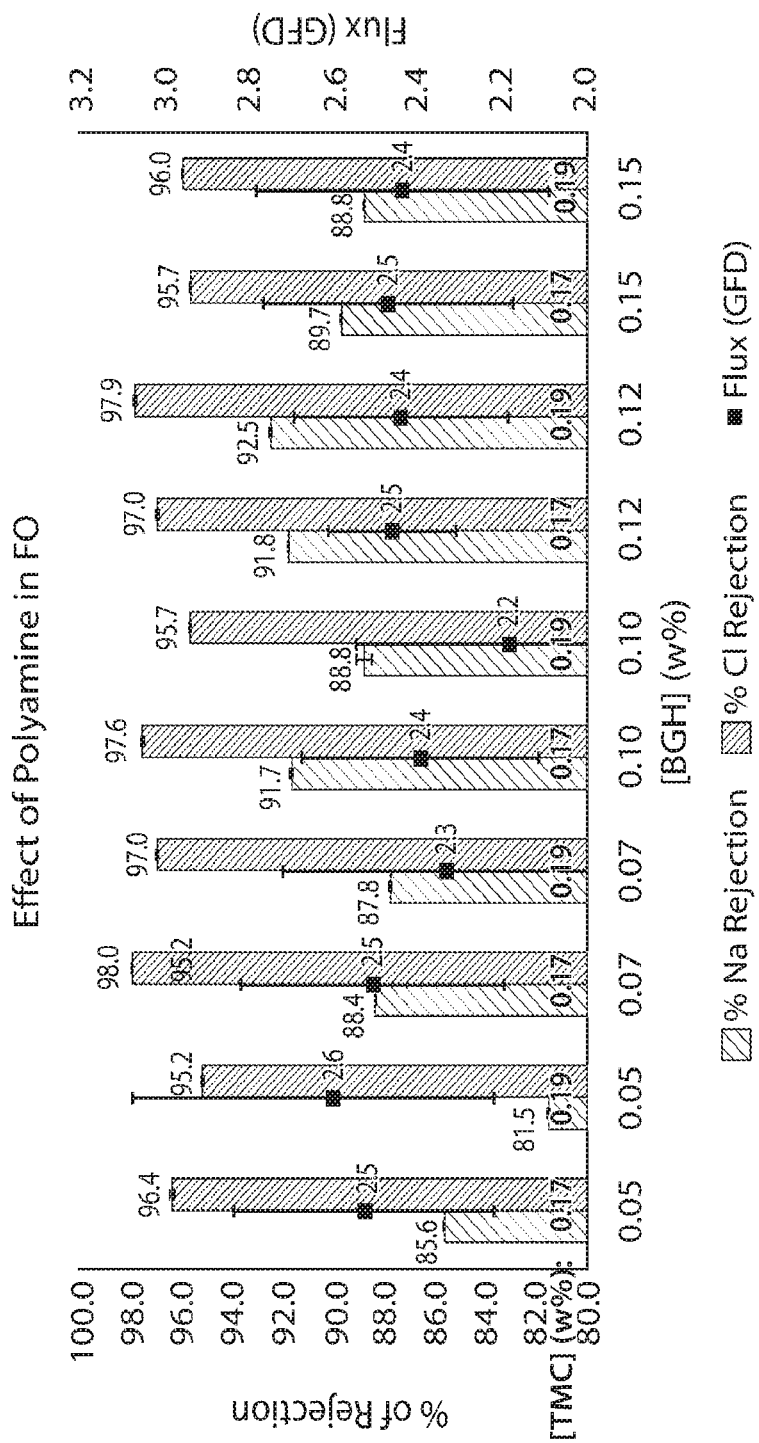

The polyamine (e.g., biguanide polymer) incorporated in the aqueous phase as described above reacts with the aldehyde in the organic phase during the interfacial polymerization and during the curing time (post-interfacial polymerization heating) to form a polymer with a higher degree of physical cross-linking. This extra cross-linking confers higher stability to the polyamine incorporated in the formulation. Although some of the polyamine functionalities react with the aldehyde, many of them remain unchanged preserving the desired properties for longer times in the selective layers, e.g., higher rejection of sodium and chloride with good water flux. At these concentrations of the polyamine (0.01% wt, 0.05% wt, 0.1% wt, and 1% wt) the rejection of sodium and chloride in FO is greatly improved without negatively affecting the water flux. For example, aqueous phases including the monomer MPD and incorporating a polyamine at concentrations of 0.01 w %, 0.05 w %, and 0.1 w % were prepared and reacted with organic phases including TMC. The different variations of polyamine concentrations were applied to a polysulfone support layer. RO tests of these formulations incorporating the polyamines at 0.01% wt and 0.1% wt gave rejections greater 98%, although with a water flux less than 30 GFD. The FO tests of the formulations incorporating the polyamines at 0.01% wt and 0.05% wt gave good and great results respectively. SEE FIGS. 1A and 1B for some of the experimental results. In some of these formulations TEA and/or TEOA were also present in the aqueous phase at about 4% wt.

Generally, the introduction of a polyamine to a membrane active layer has been shown to improve the overall active layer rejection in FO; however, in some cases where the polyamine is embedded within the active layer, there is a limit to the sodium rejection or to the amount of sodium the active layer can reject. As discussed herein, combining the polyamine with one or more additives provides for improved overall rejection (especially of sodium) by the active layer of the membrane. Some additional active layer formulas are disclosed in the following paragraphs as alternatives to the polyamide (PA) and polyamide-urea (PAU) active layers described above.

In various embodiments, the PA or PAU layer incorporates a polyamine (e.g., biguanide) and one or more nonionic surfactants, such as a poly(ethylene oxide)-poly(propylene oxide) block copolymer (e.g., a poloxamer, such as a PLURONIC or a KOLLIPHOR) or octylphenol Ethoxylates (e.g., TRITON X-100, TRITON X-305, TRITON X-405, or TRITON X-705); secondary alcohol ethoxylates (e.g., TERGITOL 15-S-5, TERGITOL 15-S-9, or TERGITOL 15-S-30); ethoxylated fatty alcohols (e.g., BRIJ L4, BRIJ C10, BRIJ 020, BRIJ S20, BRIJ S10, or BRIJ 58); cocamidopropyl hydroxysultaine (e.g., Mackam LSB 50), polyethylene glycol (e.g., PEG(18)); and/or tridecylether (e.g., TWEEN 80). These additives help form a better active layer to stop sodium and chloride passage through the membrane, at least in part, because the affinity of the additives towards the PA or PAU (or to the monomers forming the PA or PAU) improves the distribution of the polymers making up the active layer. The Applicants' test results for the PAU based membranes disclosed herein indicate better FO performance than membranes having active layers with only a single polyamine additive.

More specifically, in various embodiments, the active layer formula for a PA based membrane made via interfacial polymerization includes: an aqueous solution of MPD in a concentration of about 1 to 20%, preferably about 3 to 15%, and more preferably about 5 to 10%, TEA in a concentration of about 0.3 to 10%, preferably about 0.5 to 6%, and more preferably about 1 to 4%, HCl in a concentration of about 0.1 to 10%, preferably about 0.3 to 6%, and more preferably about 0.5 to 4%, the polyamine in a concentration of about 0.005 to 1.0%, preferably about 0.008 to 0.5%, and more preferably, about 0.01 to 0.2%, and at least a second polymeric additive (the non-ionic surfactant) in a concentration of about 0.005 to 5%, preferably about 0.01 to 3%, and more preferably about 0.05 to 1%; with an organic solution of TMC at a concentration of about 0.05 to 1%, preferably about 0.1 to 0.5%, and more preferably about 0.13 to 0.25% in a solvent such as any isoparaffin, hexane, toluene, or any non-polar solvent.

In various embodiments of a PAU based membrane made via interfacial polymerization, the active layer formula includes: an aqueous solution of MPD in a concentration of about 1 to 20%, preferably about 3 to 15%, and more preferably about 5 to 10%, TEA in a concentration of about 0.3 to 10%, preferably about 0.5 to 6%, and more preferably about 1 to 4%, HCl in a concentration of about 0.1 to 10%, preferably about 0.3 to 6%, and more preferably about 0.5 to 4%, a polymeric amine in a concentration of about 0.005 to 1.0%, preferably about 0.008 to 0.5%, and more preferably, about 0.01 to 0.2%, and at least a second polymeric additive (the non-ionic surfactant) in a concentration of 0.005 to 5%, preferably about 0.01 to 3%, and more preferably about 0.05 to 1%; with an organic solution of TMC at a concentration of about 0.05 to 1%, preferably about 0.08 to 0.5%, and more preferably about 0.01 to 0.20% and BTI in a concentration of about 0.005 to 1%, preferably about 0.008 to 0.5%, and more preferably 0.01 to 0.2% in a solvent such as any isoparaffin, hexane, toluene, or any non-polar solvent.

In alternative embodiments, the polyamine can be replaced with a polyelectrolyte. Using a polyelectrolyte would provide enhanced interactions between the forming polyamide during the interfacial polymerization and also with the polysulfone or polyethersulfone support, leading to better rejection than obtained with the polyamine. In various embodiments, polyelectrolytes would be added to the aqueous solution of already known concentrations of MPD, TEA, HCl. The concentrations of the polyelectrolytes would range from about 0.01% wt to about 2.5% wt. When the aqueous phase interacts with the organic phase, the polyelectrolyte would physically cross-link in the active layer, which is enhanced by the polyelectrolyte's affinity to the polyamide and the support layer. Some examples of polyelectrolytes that can be used for this purpose are: poly(l-lysine hydrobromide), poly(diallyldimethylammonium chloride), poly (2-vinyl-1-methylpyridinium bromide), poly(2-vinylpyridine N-oxide), poly(acrylamide-co-diallyldimethylammonium chloride), poly(allyl amine hydrochloride), poly(acrylic acid sodium salt), poly(sodium 4-styrenesulfonate), poly(4-styrenesulfonic acid-co-maleic acid) sodium salt, poly(vinyl sulfate)sodium salt, polyquaternium-2, polyanetholesulfonic acid sodium salt. Generally, the polyelectrolytes occupy the free volume left by the polyamide during its formation. The affinity of the polyelectrolytes towards the polyamide and, at the same time to the support layer (e.g., PS, PES), improves its stability and distribution in the active layer, which leads to improved rejection with a flux similar to the flux obtained previously with the polyamine additive.

Typically, after formation of the selective layer, the membrane is run through one or more rinse tanks and or drying steps (e.g., an oven). In some cases, raising the pH (e.g., from about 1.5 to 2.0) in the rinse tank can improve membrane rejection. In some embodiments, the pH may be raised to 3 or 4 pH depending on the application. Additionally, exposing the membrane during the drying step, or immediately thereafter, to an ammonia rich environment can further enhance the membrane characteristics.

Figure 2A:
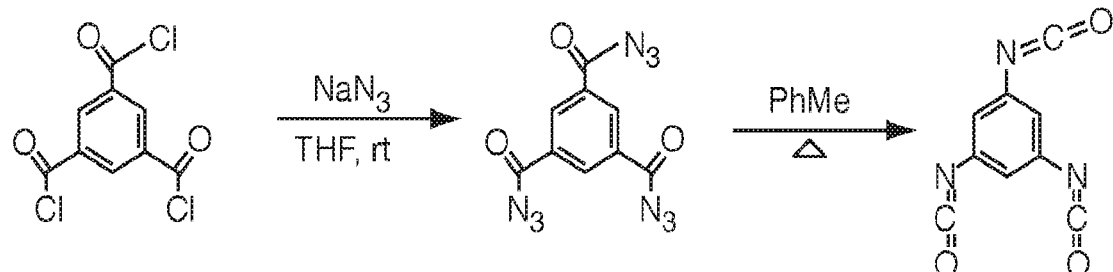
FIGS. 2A and 2B are pictorial representations of the process of forming a membrane active layer in accordance with one or more embodiments of the invention.

Additional alternative selective layers include the modification of conventional polyamide-urea selective layers, as described above with respect to the PA selective layers. Generally, the synthesis of polyamide-urea as a selective layer in a membrane via interface polymerization involves the use of the monomer 5-isocyanatoisophthaloyl chloride (ICIC), the synthesis of which uses highly toxic compounds and for which purification is difficult and requires a high vacuum pump. In addition, most synthetic alternatives for ICIC involve the use of phosgene, a lethal gas for humans. Applicants have found that by using different monomers in combination with an aromatic diamine (e.g., the MPD) they can generate a cross-linked polyamide-urea film without the need for phosgene. These monomers are synthesized without the need of phosgene in two steps. In some cases, certain commercially available monomers can be used. These new formulations make it possible to introduce the urea structure into a conventional membrane selective layer to improve fouling resistance, boron rejection and the overall robustness of the selective layer, which in turn improves the forward osmosis performance of the membrane. In addition, avoiding the use of phosgene and the subsequent safety measures, highly toxic solvents, and high vacuum pumps in monomer synthesis reduces the cost of forming the polyamide-urea selective layer of a membrane. In various embodiments, the process uses a combination of two or more monomers in the organic phase, where one of the monomers may be commercially available, while the other monomers are synthesized through two simple synthetic steps (FIG. 2A) under mild conditions, requiring no additional purification (e.g., crystallization, distillation, chromatography).

Figure 2B:
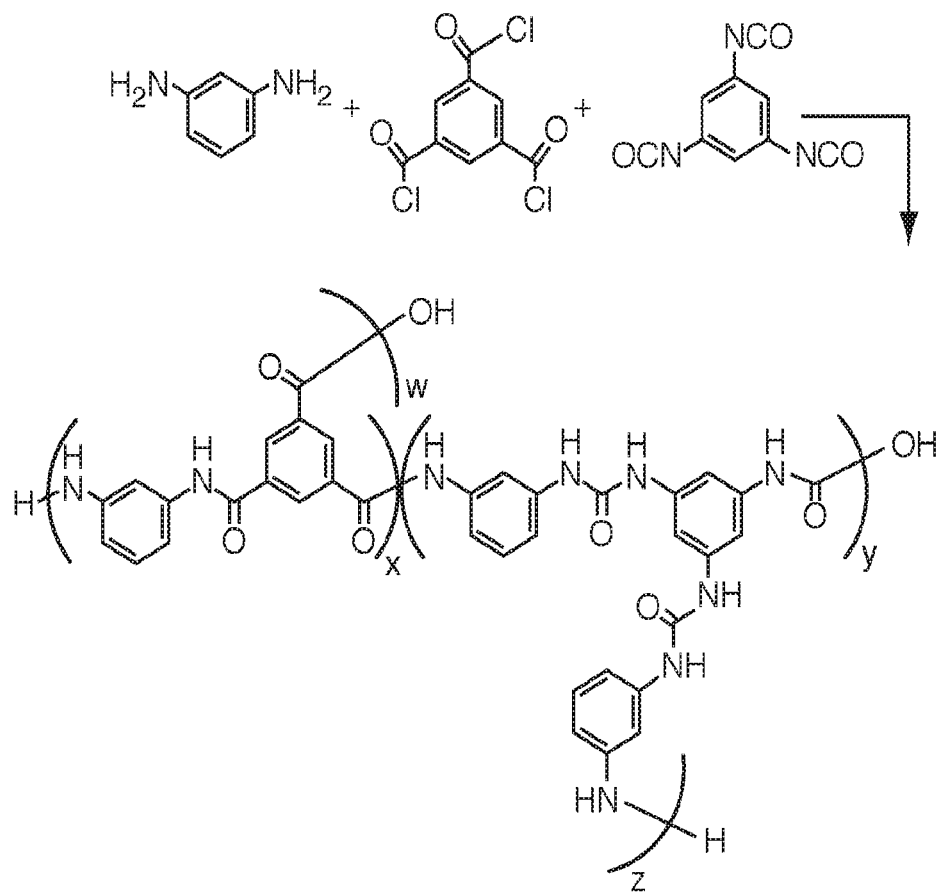

In various embodiments, the selective layer is a polyamide-urea based layer formed through interfacial polymerization between an aqueous phase containing the MPD monomer and an organic phase containing, for example, 1,3,5-trimesoylchloride (TMC) at about 0.1% wt to about 0.3% wt, preferably between about 0.15% wt to about 0.20% wt in isopar G or cyclohexane, with or without mesitylene as a co-solvent. Other monomers can be used in combination with or in place of the TMC, such as isophthaloyl chloride, 1,3,5-cyclohexanetricarbonyl chloride, 1,2-cyclohexanedicarbonyl dichloride, trans-1,4-cyclohexanedicarbonyl chloride, 1,3,5-benzenetriisocyanate (BTI), 1,3-Phenylene diisocyanate, 1,3-benzenediisocyanate (BDI), cyclohexane-1,3, 5-triisocyanate (CHTI), cyclohexane-1,3-diisocyanate (CHDI), or combinations thereof. FIG. 2B shows the reaction scheme for the polyamide-urea formation.

Generally, the polyamide-urea based selective layer is formed by the reaction of the amino groups in the MPD with (i) the carbonyl groups in the TMC and (ii) the isocyanate groups in the BTI, (or the BDI, CHTI, or CHDI, etc.), thereby randomly forming polyamide and polyurea functionalities, respectively, in a cross-linked network of a random copolymer. This polymerization happens at the interphase between the aqueous phase of the MPD and the organic phase of the TMC and the BTI (or the BDI, CHTI, or CHDI, etc.). The cross-link property of the TMC and the BTI makes the random copolymer a tridimensional cross-linked network, examples of which are shown in FIG. 2B.

In accordance with one or more embodiments, the selective layer may be characterized by a thickness adequate to impart desired salt rejection and water permeability properties while generally minimizing overall membrane thickness. In certain embodiments, the selective barrier may have an average thickness from about 50 nm and about 200 nm. The thickness of the barrier layer is desired to be as limited as possible, but also thick enough to prevent defects in the coating surface. The practice of polyamide membrane formation for pressure driven semi-permeable membranes may inform the selection of the appropriate barrier membrane thickness. The selective barrier may be formed on the surface of a porous support via polymerization, for example, via interfacial polymerization.

Polymers that may be suitable for use as porous supports in accordance with one or more embodiments include polysulfone, polyethersulfone, poly(ether sulfone ketone), poly(ether ethyl ketone), poly(phthalazinone ether sulfone ketone), polyacrylonitrile, polypropylene, poly(vinyl fluoride), polyetherimide, cellulose acetate, cellulose diacetate, and cellulose triacetate polyacrylonitrile.

In accordance with one or more embodiments, the support layer may be characterized by a thickness adequate to provide support and structural stability to a membrane during manufacture and use while generally minimizing overall membrane thickness. In certain embodiments, the polymer support may have an average thickness from about 10 um and to about 75 um. It is generally desirable for the support to be as thin as possible without compromising the quality of the support surface for interfacial polymerization of the selective layer. The smoother the support layer is, the less thickness of support material is generally required for this criterion. In at least some embodiments, this layer is less than 40 um. In certain embodiments, the porous support comprises a first side (active side) with a first plurality of pores, and a second side (support side) with a second plurality of pores. In certain embodiments, the first plurality of pores and the second plurality of pores are fluidly connected to each other. In one embodiment, polymeric additives are dispersed within the porous support. Additives may enhance hydrophilicity, strength, or other desirable properties.

In some embodiments, the invention includes a method of facilitating an osmotically driven separation process. The process includes providing a forward osmosis membrane, introducing a source of a draw solution to a first side of the membrane, and introducing a source of a feed solution to a second side of the membrane. The step of providing the forward osmosis membrane includes fabricating the membrane as disclosed above.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Furthermore, those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that the invention may be practiced otherwise than as specifically described.

What is claimed is:

1. A forward osmosis membrane comprising:
   a support substrate comprising a first surface and an opposing second surface;
   a support layer disposed on the first surface of the support substrate and comprising a polymeric material; and
   a selective layer disposed on the support layer and comprising a polyamide urea made from a polyamine, an organic base, a reactive monomer, and a benzene triisocyanate, wherein the polyamine comprises a diamine monomer, and wherein the diamine monomer comprises a diaminohydroxypyrimidine or derivatives thereof.

2. The forward osmosis membrane of claim 1, wherein the selective layer further comprises a non-ionic surfactant.

3. The forward osmosis membrane of claim 1, wherein the selective layer further comprises an aldehyde.

4. The forward osmosis membrane of claim 1, wherein the diamine monomer comprises m-phenylenediamine.

5. The forward osmosis membrane of claim 1, wherein the reactive monomer comprises trimesoyl chloride.

6. The forward osmosis membrane of claim 1, wherein the organic base comprises at least one of triethanolamine, triethylamine, or diethylamine.

7. The forward osmosis membrane of claim 1, wherein the selective layer further comprises metformin.

8. The forward osmosis membrane of claim 1, wherein the support layer comprises polysulfone.

9. A method of manufacturing a forward osmosis membrane, the method comprising the steps of:
   providing a support substrate having a first side and an opposing second side;
   depositing a polymeric support layer on the first side of the support substrate; and
   forming a selective layer on the support layer via interfacial polymerization, wherein the step of forming the selective layer comprises:
     introducing the support layer to an aqueous phase comprising a polyamine, and an organic base, wherein the polyamine comprises an aromatic diamine monomer, the aromatic diamine monomer comprises a diaminohydroxypyrimidine or derivatives thereof; and
     introducing the support layer and aqueous phase to an organic phase comprising a reactive monomer, a solvent, and benzene triisocyanate.

10. The method of claim 9, wherein the aromatic diamine monomer in the aqueous phase comprises m-phenylenediamine.

11. The method of claim 9, wherein the aqueous phase further comprises a non-ionic surfactant.

12. The method of claim 9, wherein the reactive monomer in the organic phase comprises trimesoyl chloride.

13. The method of claim 9, wherein the organic phase further comprises an aldehyde.

14. The method of claim 9, wherein the selective layer further comprises metformin.

* * * * *